United States Patent Office 2,906,256
Patented Sept. 29, 1959

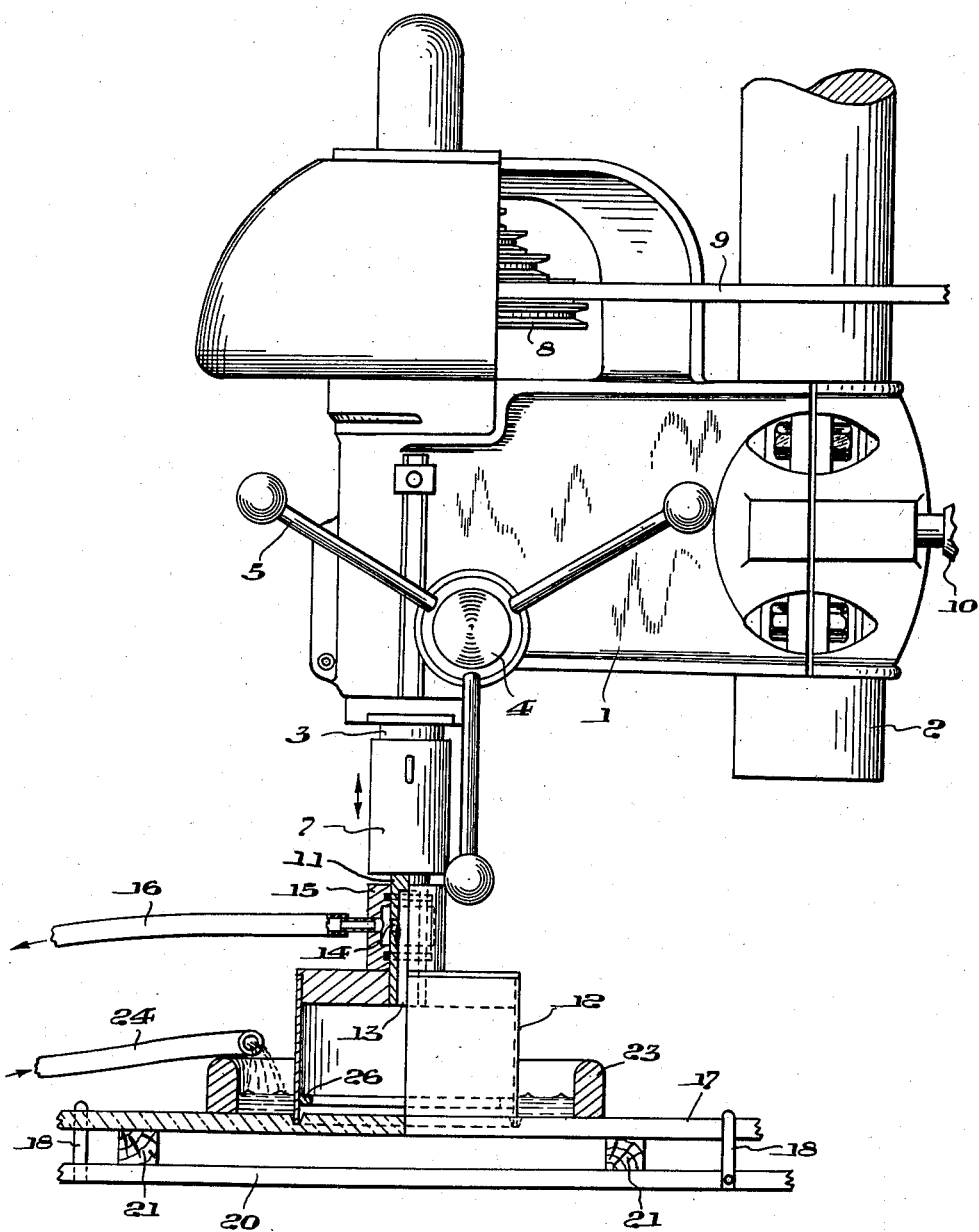

2,906,256

METHOD AND APPARATUS FOR DRILLING LARGE HOLES THROUGH GLASS SHEETS

Theodore W. Glynn, Kingsport, Tenn., assignor to Blue Ridge Glass Corporation, Kingsport, Tenn., a corporation of New York Application July 8, 1958, Serial No. 747,224

7 Claims. (Cl. 125—20)

This invention relates to the drilling of holes in glass sheets, and more particularly to the cutting of rather large holes.

Small holes can be drilled in glass sheets by means of solid rod-like drills. Large holes require the use of tubular drills having an annular cutting edge at one end. The usual way of drilling glass with tube drills includes feeding water to the inside of a drill in order to cool its cutting edge and carry away the ground glass. The water pressure inside the drill tends to force the drill upward away from the sheet of glass. To overcome this pressure and provide enough additional pressure to make the drill cut, a heavy feed pressure for the drill is required. For example, with 10 pounds of water pressure inside a drill for drilling 6⅛ inch diameter holes, the lifting pressure exerted by the water on the drill is about 300 pounds. Since an additional 300 pounds may be required to make the drill cut, the result is that a total downward pressure against the drill of 600 pounds is necessary. Such heavy feed pressure requires a very rigid drill press in order to avoid excessive vibration. Furthermore, the pressure required to make the drill cut imposes a large bending moment on the glass sheet unless the glass is uniformly supported or is embedded in plaster. This bending moment, together with vibration, frequently result in breakage of the sheet.

It is among the objects of this invention to provide a method and apparatus for drilling holes through a glass sheet, in which the drill can be fed forward at any desired speed without subjecting the sheet to a bending moment that might break it, in which no mechanical pressure need be applied to the drill to make it cut, in which the sheet need not be supported uniformly, and in which a light-weight drill press may be used successfully.

In accordance with this invention, a tube drill is placed against one side of a stationary glass sheet and then the air pressure inside the drill is reduced considerably. This draws the sheet and the drill tightly together without exerting a dangerous bending moment on the sheet. The drill then can be rotated to make a circular cut through the glass. Preferably, water is supplied to the outside of the drill around its cutting end. Also, the inside of the drill may be provided with radially projecting means that will stop movement into the drill of the glass disc that is cut by it out of the sheet. This prevents the disc from tending to expand the drill and it also makes removal of the disc from the drill much easier.

The invention is illustrated in the accompanying drawing, in which the single figure is a side view, partly in vertical section, of apparatus for carrying out the invention.

Referring to the drawing, a more or less conventional drill press is shown, which includes a housing 1 clamped to a supporting post 2 and projecting forward from it. Slidable vertically in the front end of the housing is a sleeve 3 that may be moved up and down in the usual way by turning a shaft 4 to which handles 5 are attached. The sleeve has free axial or vertical movement because there is nothing to prevent it from being pulled down or pushed up into the housing. Journaled in this sleeve is a drive shaft or spindle (not shown), the lower end of which projects below the sleeve and carries a chuck 7. The spindle cannot move up and down in the sleeve, but of course can move with it. The upper end of the spindle extends up through pulleys 8 that are splined on it. These pulleys are driven by a belt 9 from an electric motor (not shown) supported by a bracket 10 attached to the back of the housing.

Secured in chuck 7 is the shank 11 of a diamond tube drill 12, the lower end of which provides an annular cutting edge made of abrasive material, such as diamond particles and the like. The drill may be counterweighted in a conventional manner, or shaft 4 may be provided with a spring that will support the drill in any desired vertical position so that it floats. This is standard construction in drill presses. On the other hand, there is no objection to the drill exerting a small downward pressure on a sheet of glass that it is to cut, such as the harmless pressure due to the weight of the drill and spindle. However, such pressure is so small that it would require entirely too much time to cut through the sheet.

It is a feature of this invention that the drill and a glass sheet can be pressed together as tightly as desired for a very rapid cut, without the drill exerting an appreciable bending moment on the sheet. Therefore, there is no danger of the sheet being broken by pressure of the drill against it. One way of obtaining this desirable result is to provide the lower end of the shank 11 with an axial passage 13 that leads up out of the drill to a point below the lower end of the chuck. Between the chuck and the drill the shank is provided with one or more radial openings 14 that connect passage 13 with the inside of a packing gland 15 connected by a hose 16 to a vacuum tank or pump (not shown). By reducing the air pressure inside the drill while it is rotating against a glass sheet 17, the sheet and drill will be drawn tightly together by the suction. The greater the vacuum in the drill, the greater the pressure of the drill and sheet against each other. It will be seen, however, that this pressure does not exert a downward pressure on the sheet, because the upward atmospheric pressure on the sheet is the same as the downward atmospheric pressure on the drill while the drill is being drawn down against the sheet by the subatmospheric pressure in the drill.

Another way of reducing the air pressure inside the drill is to first drill a small hole through the glass, and then connect the source of suction to the lower end of that hole to draw air out of the drill.

Since the sheet is not embedded in plaster and is not pressed tightly against a flat supporting table, it must be held stationary (prevented from rotating with the drill) by suitable means, such as stops 18 at its edges. The sheet preferably is supported above a table 20 by means of spaced blocks 21, so that the drill can emerge from its lower surface to make a clean cut. Spaced supports for the sheet are possible because of the lack of an appreciable bending moment on it, which might break it. As the drill press itself does not need to exert any pressure on the sheet, the press can be very light.

The rate of feed of the drill through the sheet can be adjusted simply by adjusting the vacuum. As an example, it might require ten minutes to drill a six inch hole safely with conventional methods. With my method, such a hole can be drilled in about 45 seconds and with no danger of breaking the sheet. Of course, the drilling rate would be the same in both cases if there were equal unit pressures on the cutting edge of the drill, but the big advantage of my method is that much higher unit pressures can be used without imposing dangerous bending stress on the sheet. The importance of high speed drilling can be understood from the fact that in some cases thousands of large holes have to be drilled in glass sheets to be used in constructing a single building.

To keep the drill cool and removing the ground material, water is supplied to the outside of the drill around its cutting edge. This can be done by a stream flowing around the drill or, where the glass sheet is horizontal, by placing a temporary dam 23 around the drill in engagement with the sheet and delivering water from a hose 24 to the space between the dam and the drill. Of course, some of the cooling water will be drawn up into the drill from beneath its cutting edge until the sheet is penetrated and the water released through the hole. Steps must therefore be taken to prevent the water from being pulled into the vacuum line if a piston vacuum pump is used. A separating tank in the line could be used. If a rotary rubber-lined vacuum pump is employed, the water and the ground glass particles could go through it without damage.

Just before the drill penetrates the lower surface of the sheet, the vacuum will break away from the sheet the circular disc of glass that is being cut and will suck the disc up into the drill. Since the lower edge of the disc will have a fin formed when it broke, the lower part of the disc is larger than the rest of it and would tend to expand the lower end of the thin walled drill and cause it to break the sheet. Also, the disc would stick up in the drill and have to be broken in order to be removed. To prevent these things from occurring, it is desirable to provide the inside of the drill with radial means, preferably a vertically adjustable shoulder 26, a short distance above the cutting edge. It should be located only high enough in the drill to permit the drill to penetrate the glass. This shoulder will arrest upward movement of the disc in the drill before it can do any damage.

If desired, a sheet of glass can be drilled from both sides by using two axially aligned drills. In such a case it is best to arrange the drills with their spindles horizontal so that water can be fed to both sides of the vertical sheet of glass. To prevent the glass disc cut from the sheet from rotating with one or the other of the drills at the moment the disc breaks loose, which might cause breakage of the sheet, one of the drills is provided with a shoulder like the one disclosed. That drill is stopped rotating and locked when the shoulder reaches the sheet. Drill presses are frequently equipped with brake motors that cannot be turned after the power is shut off. By leaving the vacuum on, the disc will be clamped against the stationary shoulder and will not rotate when the drill from the opposite side frees the disc from the sheet.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In the method of drilling holes through a glass sheet by means of a rotating tube drill, the steps comprising mounting the sheet in fixed position, placing the drill against one side of it, and reducing the air pressure inside the drill to draw it and the sheet tightly together, whereby the drill will make a circular cut through the glass without exerting a dangerous bending moment on the sheet.

2. In the method of drilling holes through a glass sheet by means of a rotating tube drill, the steps comprising mounting the sheet in fixed position, placing the drill against one side of it, reducing the air pressure inside the drill to draw it and the sheet tightly together and supplying water to the outside of the drill around its cutting end, whereby the drill will make a circular cut through the glass without exerting a dangerous bending moment on the sheet.

3. In the method of drilling holes through a glass sheet by means of a rotating tube drill, the steps comprising mounting the sheet in fixed position, placing the drill against one side of it, reducing the air pressure inside the drill to draw it and the sheet tightly together, whereby without exerting a dangerous bending moment on the sheet the drill will cut out of it a glass disc that will be drawn into the drill, and arresting the inward movement of said disc at a predetermined point inside the drill close to its cutting end.

4. Apparatus for drilling a hole through a stationary glass sheet, comprising a tube drill having a circular cutting edge, a drive shaft for rotating the drill, means supporting the drive shaft for free axial movement in opposite directions, means connected with the drill for reducing the air pressure in it while its cutting edge engages the sheet, whereby the drill and sheet will be drawn toward each other and the drill will make a circular cut through the sheet without exerting a dangerous bending moment on it, and means for delivering a stream of water to the outside of the drill around its cutting edge.

5. Apparatus for drilling a hole through a stationary horizontal glass sheet, comprising a vertical tube drill having a circular lower cutting edge adapted to be disposed above the sheet, a vertical drive shaft for rotating the drill, means supporting the drive shaft for free axial movement in opposite directions, means connected with the drill for reducing the air pressure in it while its cutting edge engages the sheet, whereby the drill and sheet will be drawn toward each other and the drill will make a circular cut through the sheet without exerting a dangerous gending moment on it, a dam adapted to be mounted on the sheet around the drill, and means for delivering water to the inside of the dam to immerse the cutting edge of the drill.

6. Apparatus for drilling a hole through a stationary glass sheet, comprising a tube drill having a circular cutting edge, a drive shaft for rotating the drill, means supporting the drive shaft for free axial movement in opposite directions, means for reducing the air pressure in it while its cutting edge engages the sheet, whereby the drill and sheet will be drawn toward each other and the drill will make a circular cut through the sheet without exerting a dangerous bending moment on it, and means projecting radially inward from the inside of the drill near its cutting edge to stop movement into the drill of the glass disc cut by it out of the sheet.

7. Drilling apparatus as defined in claim 6, in which said projecting means is an annular shoulder.

References Cited in the file of this patent

UNITED STATES PATENTS

| | | |
|---|---|---|
| 1,037,851 | Beam | Sept. 10, 1912 |
| 2,124,609 | Dickenson | July 26, 1938 |
| 2,151,205 | Hawin | Mar. 21, 1939 |
| 2,413,084 | Sommer et al. | Dec. 24, 1946 |
| 2,569,854 | Hatcher | Oct. 2, 1951 |
| 2,638,084 | McLaughlin | May 12, 1953 |
| 2,680,435 | Gonzalez | June 8, 1954 |